(12) United States Patent
Hansen et al.

(10) Patent No.: US 6,269,136 B1
(45) Date of Patent: Jul. 31, 2001

(54) DIGITAL DIFFERENTIAL ANALYZER DATA SYNCHRONIZER

(75) Inventors: Craig C. Hansen, Los Altos; Timothy B. Robinson, Boulder Creek, both of CA (US)

(73) Assignee: Microunity Systems Engineering, Inc., Sunnyvale, CA (US)

( * ) Notice: Subject to any disclaimer, the term of this patent is extended or adjusted under 35 U.S.C. 154(b) by 0 days.

(21) Appl. No.: 09/017,224

(22) Filed: Feb. 2, 1998

(51) Int. Cl.[7] ................................. H04L 7/00; H04J 3/06; H03D 13/00
(52) U.S. Cl. .......................... 375/354; 375/355; 370/503; 327/40
(58) Field of Search ..................................... 375/354, 355, 375/371, 372, 362, 364; 370/503, 516, 517, 519; 327/39, 40, 44, 45, 47

(56) References Cited

U.S. PATENT DOCUMENTS

| | | | |
|---|---|---|---|
| 5,422,914 | * | 6/1995 | Snyder ................................. 375/354 |
| 5,497,405 | * | 3/1996 | Elliott et al. ........................ 375/372 |
| 5,572,556 | * | 11/1996 | Satoh .................................... 375/372 |
| 5,621,775 | * | 4/1997 | Etienne ................................. 375/372 |
| 5,642,387 | * | 6/1997 | Fukasawa ............................. 375/372 |
| 5,699,391 | * | 12/1997 | Mazzurco et al. .................... 375/372 |
| 5,822,327 | * | 10/1998 | Satou .................................... 370/505 |
| 5,872,821 | * | 2/1999 | Schoffel ............................... 375/371 |
| 5,905,766 | * | 5/1999 | Nguyen ................................. 375/354 |
| 5,956,377 | * | 9/1999 | Lang ..................................... 375/372 |

* cited by examiner

*Primary Examiner*—Chi Pham
*Assistant Examiner*—Khai Tran
(74) *Attorney, Agent, or Firm*—McDermott, Will & Emery

(57) ABSTRACT

A digital differential analyzer data synchronizer receives data at a first clock rate and synchronizes the data to a second clock rate. The two clock rates are related by a ratio of two integers, but have a variable phase relationship. The synchronizer places incoming data into a series of registers at the first clock rate. A digital differential analyzer functions to generate a synchronization signal having a frequency proportional to a ratio of the first clock rate and the second clock rate. A multiplexer is utilized for sequentially reading the plurality of registers at a rate corresponding to the frequency of the synchronization signal.

8 Claims, 4 Drawing Sheets

DIGITAL DIFFERENTIAL ANALYZER DATA SYNCHRONIZER

FIELD OF THE INVENTION

The present invention relates to a method and apparatus for the synchronization of data between two distinct clock domains.

BACKGROUND OF THE INVENTION

In numerous systems capable of the transmission and the reception of data, there is often a need for the synchronization of data transmitted with an associated clock signal having known frequency and varying phase, with the clock signal of the receiving system. For example, such synchronization is necessary in a master system which transmits a request data stream with an associated request clock signal to a subsidiary system which receives the data stream and request clock signal and transmits a response data stream, with an associated response clock signal. The master system receives the response data steam and associated response clock signal. The response clock signal has a known frequency, but unknown phase, due to a variable delay in the data and clock paths.

The variable delay occurs in both the request data stream and request clock signal and the response data stream and response clock signal due to the combination of circuit delays and wire transmission delays. The delay may also vary after the system is initialized, due to the dependence of the delays upon, for example, temperature, operating voltage, and physical tension of the cable connecting the systems. In both cases (i.e., transmission and reception), the received clock signal can be used to generate a sampling clock which is used to reliably sample the data. The subsidiary system may use the sampling clock to synchronously clock all its storage elements or delay elements (such as latches, flip-flops, and phase delays), thus avoiding any problem of clock asynchrony.

However, the master system is faced with a Hobson's choice, as the master system may choose synchrony with either the request clock signal or the response clock signal, but not both. If synchrony with the request clock signal is maintained, a data synchronizer must be placed in the receiver of the master system, as the phase of the response clock signal is not predictable with respect to the request clock signal.

The choice of an optimal main system clock rate may depend on factors other than the required communication rate between the main and subsidiary systems, such as the delay of internal circuits and interconnections, required internal computation rates, and so on. When the rate of the main system clock is different from the rate of the request clock signal, both the request clock signal and response clock signal are asynchronous with the main system clock, and data synchronization is required in data paths both in the request data path and the response data path.

Thus, in systems transmitting and receiving data to and from various subsidiary systems, there exists a need for a method and apparatus for synchronizing both request data streams and response data streams to the clock signal of the receiving device, which accomplishes the synchronization with minimal delay and maximum reliability.

SUMMARY OF THE INVENTION

Accordingly, it is an object of the present invention to provide a method and apparatus for synchronizing a request data signal (also referred to as a data stream) to a communications clock and to synchronize a response data signal to a main system clock, with the synchronization being accomplished with minimal delay and maximum reliability.

More specifically, the present invention relates to a method of synchronizing a data stream between two distinct clock domains. The novel method comprising the steps of receiving the data stream at a first clock rate M, sequentially loading the data stream into a plurality of registers at the first clock rate, utilizing a digital differential analyzer to generate a synchronization signal having a frequency proportional to a ratio of the first clock rate M and a second clock rate N, and sequentially reading the plurality of registers at a rate corresponding to the frequency of the synchronization signal.

The present invention also relates to an apparatus for synchronizing a data stream between two distinct clock domains. The apparatus comprises an input means for receiving the data stream at a first clock rate M, means for sequentially loading the data stream into a plurality of registers at the first clock rate, a digital differential analyzer operative for generating a synchronization signal having a frequency proportional to a ratio of the first clock rate M and a second clock rate N; and means for sequentially reading the plurality of registers at a rate corresponding to the frequency of the synchronization signal.

As described in detail below, the method and apparatus of the present invention provides important advantages over the prior art. Most importantly, the present invention performs the required data synchronization with minimal delay and maximum reliability.

The present invention accommodates large variations in phase delay of the subsidiary system, variations which may be in excess of the cycle time. Additional delay is accommodated by adjusting the number of registers into which the data stream is loaded into and read from.

The present invention avoids the use of repeated asynchronous sampling of the high bandwidth signals and clocks, which is a source of failure in prior art synchronizer designs. Asynchronous sampling is the use of an unsynchronized clock to sample a signal or clock; when the sample point occurs nearly simultaneous with the time that the signal or clock changes, an inherent metastability occurs in the sampling circuit, which can take an arbitrarily long time to be resolved into a stable logic level. After initialization, the present invention has no use of asynchronous sampling, so it is free from synchronizer failure.

The present invention allows for the use of a wide variety of clock rates in a single design, as timing-sensitive delay elements are limited to the phase-locked loops and phase-delay elements. These elements are explicitly programmable with the desired clock rates (M and N) so that necessary adjustments to these elements need not be discovered dynamically from the incoming clock signals.

Additional advantages of the present invention will become apparent to those skilled in the art from the following detailed description of exemplary embodiments of the present invention.

The invention itself, together with further objects and advantages, can be better understood by reference to the following detailed description and the accompanying drawings.

DETAILED DESCRIPTION

The following detailed description relates to a novel digital differential analyzer data synchronizer. In the description, numerous specific details are set forth, such as word size, clock rates etc., in order to provide a thorough understanding of the present invention. It will be obvious, however, to one skilled in the art that these specific details need not be employed to practice the present invention. In other instances, well-known system structures have not been described in detail in order to avoid unnecessarily obscuring the present invention.

Figure 1:
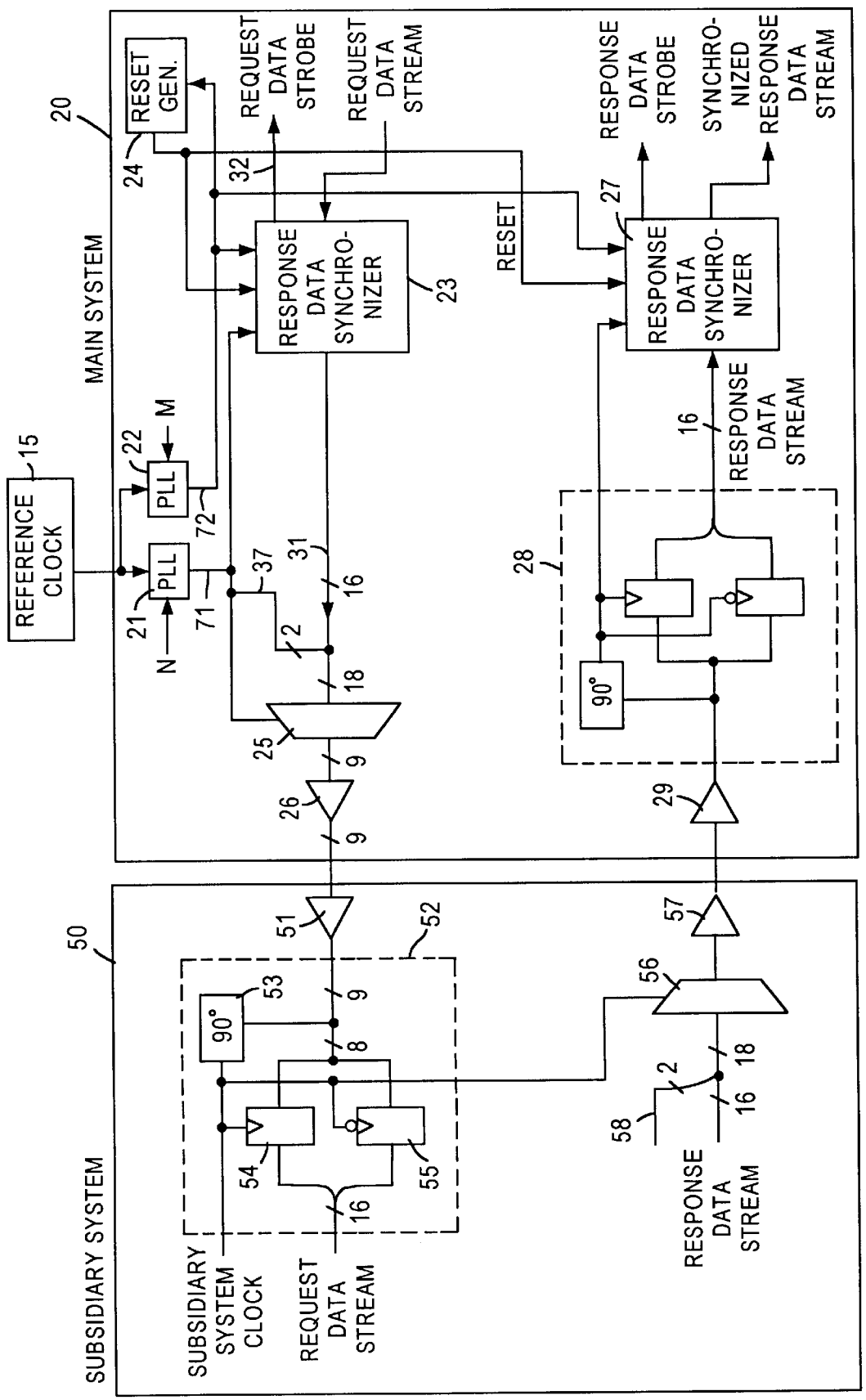
FIG. 1 illustrates a data communication system having a main system and a subsidiary system and which incorporates an exemplary embodiment of a digital differential analyzer data synchronizer in accordance with the present invention.

As stated above, FIG. 1 illustrates an exemplary data communication system which incorporates the digital differential analyzer data synchronizer of the present invention. The system provides the ability to transfer data between systems operating with different clock references. In the embodiment of FIG. 1, the two systems are referred to as the main system 20 and the subsidiary system 50. It is noted that only the data transmission and reception sections of the "main" and "subsidiary" systems, which incorporate the digital differential analyzer data synchronizer of the present invention are illustrated.

As shown, the main system 20 receives a master clock 15 (also referred to as a reference clock) as an input signal. The reference clock 15 is coupled to two phase-locked loop "PLL" clock generators 21, 22, which are utilized to generate a communications clock 71 and a main system clock 72. Typically, the communications clock has a frequency of N times the reference clock frequency and the master clock has a frequency of M times the reference clock frequency, where N<M.

The main system 20 further comprises a request data synchronizer 23, a response data synchronizer 27, a reset generator 24, a multiplexer 25, a quadrature circuit 28 and two amplifiers 26 and 29.

Referring again to FIG. 1, the request data synchronizer 23 receives as inputs, the communications clock 71, the main system clock 72, a reset signal generated by the reset generator 24 and the request data stream to be synchronized. The request data synchronizer 23 generates a synchronized request data stream 31 and a request data strobe 32 as outputs. While the operation of the request data synchronizer 23 is explained in detail below, generally speaking, it functions to synchronize the request data stream (i.e., the data transferred to the subsidiary system) to the communications clock 71.

Figure 2:
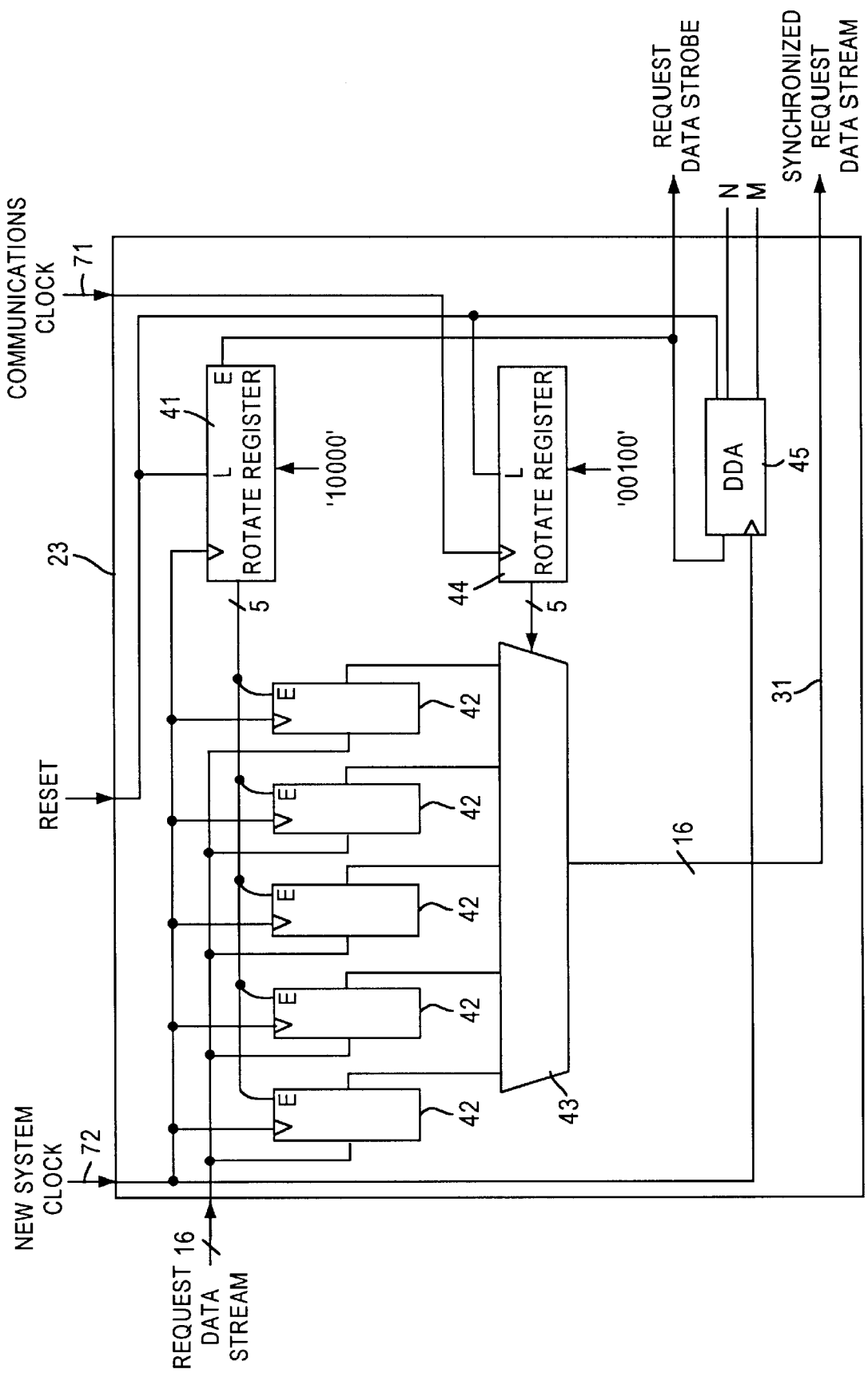
FIG. 2 illustrates an exemplary embodiment of the request data synchronizer of the present invention.

FIG. 2 illustrates an exemplary embodiment of the request data synchronizer 23 of the present invention. As shown, the request data synchronizer 23 comprises a first 5-bit rotate register 41 which is clocked by the main system clock 72 and loaded such that only a single bit is equal to "1" (e.g., "10000"). The rotate register 41 is enabled to rotate only on N of every M cycles by digital differential analyzer 45. The synchronizer 23 further comprises five 16-bit registers 42 each of which: (1) receives the request data stream as an input; (2) is clocked by the main system clock 72; and (3) are enabled by the first rotate register 41. The output of each of the five 16-bit registers 42 is coupled to the input port of a 5:1 multiplexer 43. The output of the multiplexer 43 is selected by the output of a second 5-bit rotate register 44, which is clocked by the communications clock 71 and loaded such that only a single bit is equal to "1". The synchronizer 23 further comprises a digital differential analyzer 45 which receives N and M as inputs, and which is enabled by the main system clock 72. The digital differential analyzer "DDA" is a sequential circuit which generates an enabling output with frequency y/x relative to its input clock. The use of a DDA is well-known as a technique for scan-converting lines for a raster display, also referred to as Bresenham's Line Algorithm. (See J. D. Foley and A. Van Dam, Fundamentals of Computer Graphics, Addison-Wesley, 1982, pp 432–436.)

The operation of the request data synchronizer 23 is as follows. Initialization is critical to proper operation of the data synchronizer. Data loaded into the data registers 42 must not be read until it is certain that the data is stable; delays occur due to the inherent delay of the register storage element itself and known variations in the relative delay of the two clock signals. The number of data registers 42 and initial state of the first rotate register 41 and the second rotate register 44 is selected to ensure that a sufficient delay occurs between loading data into a data register 42 and reading the data, so that data is always present and stable when read. Because the reset signal is asynchronous to at least one of the main system clock 72 and the communications clock 71, there can be a small uncertainty in the initial state of the rotate registers, this is dealt with by selecting a sufficient initial state of the rotate registers to ensure reliable operation regardless of position of the reset signal.

The first rotate register 41 functions to sequentially select one of the five 16-bit registers to receive the 16-bit request data stream (i.e., loaded into the register). As both the first rotate register 41 and each of the five 16-bit registers 42 are clocked by the main system clock, and are enabled by the DDA 45, on each enabled clock cycle of the main system clock, a new value of the request data stream (i.e., a 16-bit word) is loaded into one of the five registers 42. The loading of registers 42 occurs in a circular manner, meaning that after the fifth register 42 has been loaded, the rotate register 41 enables the first register 42 again and a new value is written into the first register. Thus, the loading process continually repeats itself.

As indicated above, the second rotate register 44 operates in combination with the multiplexer 43 to select one of the five registers 42. Importantly, however, the second rotate register 44 is clocked by the communications clock 71. The DDA 45 receives N and M as inputs, and functions to output N enabling signal values every M clock cycles (the output signal of the DDA 45 is referred to herein as the synchronization signal).

As a result, the synchronized request data stream output by the synchronizer 23 comprises N words of data every M clock cycles, where each word of data represents the output of a single register 42. In addition, the DDA 45 functions to spread the N words of data as evenly as possible over M clock cycles. As such, the request data synchronizer 23 synchronizes the request data stream, which was read into the synchronizer 23 at the main system clock rate, to the communications clock 71.

It is noted that in the foregoing embodiment of the request data synchronizer 23, with regard to sequentially reading registers 42 via the multiplexer 43 and the rotate register 44, it must be accomplished such that the data read into the registers 42 has sufficient time to stabilize. This is accomplished by initializing the two rotate registers with their "1" bit in offset locations, as shown by register 41 initialized to "10000" and register 44 to "00100".

After the request data stream is synchronized to the communications clock 71 the stream is coupled to multiplexer 25. Multiplexer 25 is controlled by the communications clock 71 and functions to transmit the data stream on the rising and falling edges of the clock signal. In the current embodiment, during each clock cycle of the communications clock 71, a 16-bit word of the synchronized request data stream is presented to the multiplexer 25, along with an additional two bits 37 which represent the state of the communications clock 71 (i.e., either high or low). Signal 37 causes the multiplexer 25 to generate a copy of the communications clock 71 as one of the 9 bits transmitted via amplifier 26, but this copy is designed to have the same timing characteristics as the synchronized request data stream. In particular, the rising and falling times of the generated copy of the communications clock matches that of the 8 data signals of the synchronized request data stream, a fact used by the subsidiary system to receive and recover the data. On a rising edge of the communications clock 71, a first 8-bits of the 16-bit data word present at the multiplexer 25 and one bit indicating that the communications clock 71 is high, are transmitted to the subsidiary system 50 via amplifier 26. Then, on the next falling edge of the communications clock 71, the remaining 8-bits of the word present at the multiplexer 25, and an additional bit indicating that the communications clock 71 is low, are transmitted to the subsidiary system 50. As such, 8-bits of data are transmitted to the subsidiary system every half-cycle of the communications clock 71.

The subsidiary system 50 comprises an amplifier 51 and quadrature circuit 52, which operate to receive the transmitted signal and reconstruct the 16-bit word of the synchronized request data stream. As shown, the quadrature circuit 52 functions to separate the 8-bit portion and the single bit representing the communications clock 71 upon receipt of the 9-bit signal. The bit representing the communications clock 71 is coupled to a phase shifter 53. The phase shifter 53 generates a clock signal with the same clock rate as the communications clock 71 with an appropriate phase for sampling the data at a time when the data is stable, approximately a 90 degree (one-quarter cycle) phase shift. The clock signal generated by the phase shifter 53 is then utilized to sample the data stored in the registers 54 and 55 on both the rising edge and the falling edge of the signal output by the phase shifter 53. As a result, the 16-bit data word is recovered each complete clock cycle of the communications clock 71.

The subsidiary system further comprises a multiplexer 56 and an amplifier 57, which function in an identical manner to the multiplexer 25 and amplifier 26 of the main system 20, to transmit 8 bits of a 16-bit data word of the response data stream every half-cycle of the communications clock 71. As shown, the multiplexer 56 is controlled by the output of the phase shifter 53, and receives a 16-bit data word and a two bit signal 58, which is essentially a copy of the signal output by the phase shifter 53.

Referring again to FIG. 1, the main system 20 comprises an amplifier 29 and a quadrature circuit 28, which is identical to the quadrature circuit 52 of the subsidiary system 50, and functions reconstruct the 16-bit response data stream transmitted by the subsidiary system 50.

The reconstructed response data stream is then coupled to the response data synchronizer 27, which is structurally similar to and functions in the a similar manner as the request data synchronizer 23. Specifically, the response data synchronizer 27, transforms the response data stream, which as received, at the same rate but asynchronous with the communications clock 71, to a data stream which is synchronous with the main system clock 72 (the operation of the request data synchronizer 23 is only different from the response data synchronizer 27 in that the incoming data stream is transformed from the main system clock domain to the communications clock domain). The subsidiary system generates a variable phase delay to the response data stream, therefore the precise phase of the received clock is not as precisely known as the communications clock 71, and consequently, the response data synchronizer may require a greater number of instances of data register 42 than the number of instances required in the request data synchronizer. To clarify the similarity of the request and response data synchronizer, the same number of instances (five) of the data register 42 are shown in each.

Figure 3:
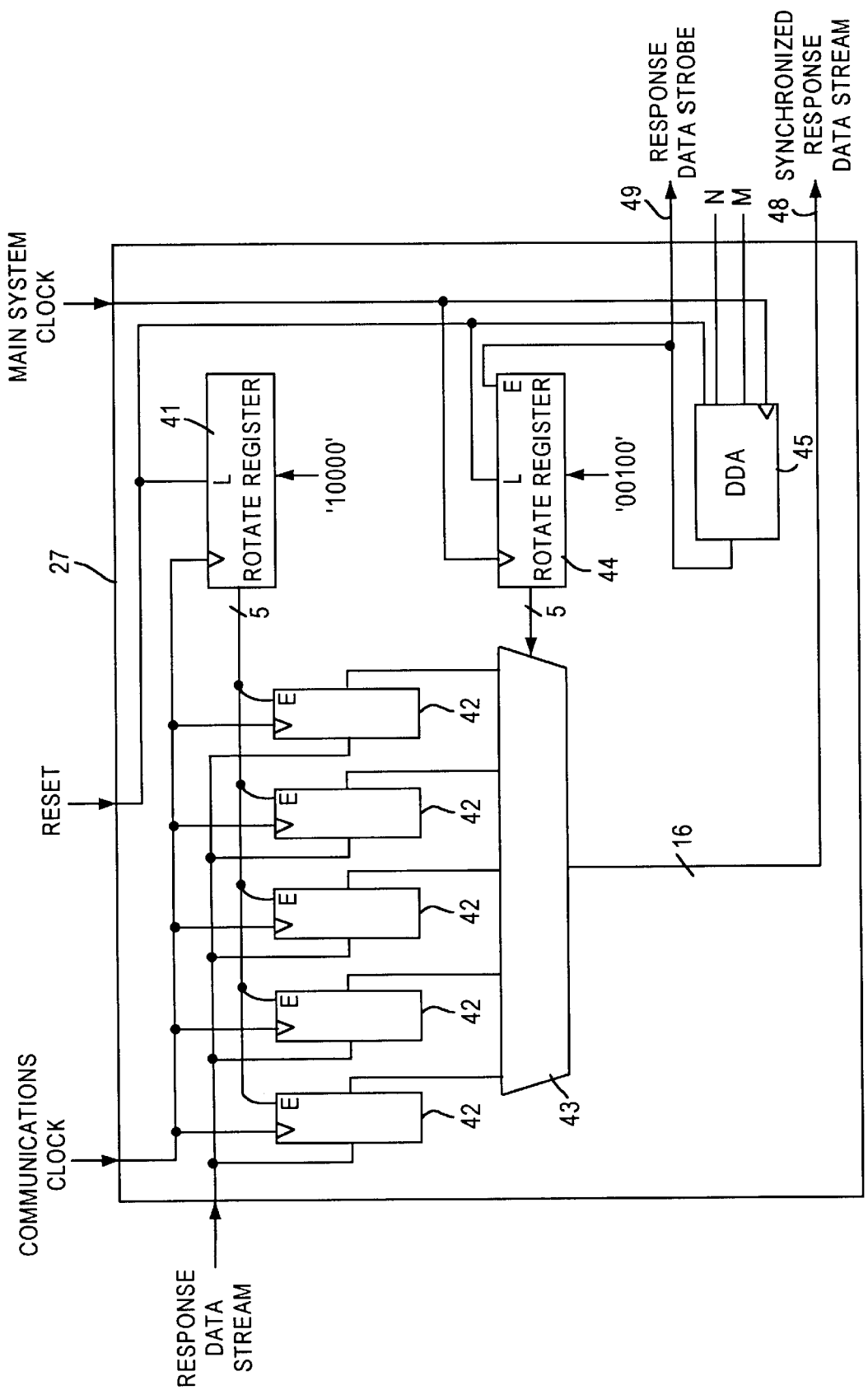
FIG. 3 illustrates an exemplary embodiment of the response data synchronizer of the present invention.

Referring to FIG. 3, which is illustrates an exemplary embodiment of the response data synchronizer 27 of the present invention, the response data synchronizer 27 receives as inputs, the communications clock 71, the main system clock 72, a reset signal generated by the reset generator 24 and the response data stream to be synchronized. The response data synchronizer 27 generates a synchronized response data stream 48 and a request data strobe 49 as outputs.

As with the request data synchronizer 23, the response data synchronizer 27 comprises a first 5-bit "rotate" register 41 which is clocked by the communications clock 71 and loaded such that only a single bit is equal to "1". The synchronizer 27 also comprises five 16-bit registers each of which: (1) receive the response data stream as an input, (2) are clocked by the communications clock 71, and (3) are enabled by the first rotate register 41. The output of each of the five 16-bit registers 42 is coupled to the input port of a 5:1 multiplexer 43. The output of the multiplier 43 is controlled/selected by the output of a second 5-bit "rotate" register 44, which is clocked by the main system clock 72 and loaded such that only a single bit is equal to "1". The synchronizer 27 further comprises a digital differential analyzer 45 which receives the communications clock 71 and the main system clock 72 as inputs, and which is enabled by the main system clock 72.

Upon initialization, the first rotate register 41 functions to sequentially select one of the five 16-bit registers to receive the 16-bit request data stream (i.e., loaded into the register). As both the first rotate register 41 and each of the five 16-bit registers 42 are clocked by the communications clock 71, on each clock cycle of the communications clock 71, a new value of the response data stream is loaded into one of the five registers 42. The loading of registers 42 occurs in a circular manner, meaning that after the fifth register 42 has been loaded, the rotate register once again enables the first register 42 and a new value is written into the first register, and the loading process begins again.

As indicated above, the second rotate register 44 operates in combination with the multiplexer 43 to select one of the five registers 42. The second rotate register 44 is clocked by the main system clock 72 and enabled by the output of the DDA 45. The DDA 45 receives N and M and main system clock 72 as inputs, and functions to output a synchronization signal having N pulses every M clock cycles. As a result, the synchronized response data stream output by the synchronizer 23 comprises N words of data every M clock cycles, where each word of data represents the output of a single register 42. In addition, the DDA 45 functions to spread the N words of data as evenly as possible over M clock cycles. As such, the response data synchronizer 27 functions to synchronize the response data stream to the main system clock 72.

Figure 4:
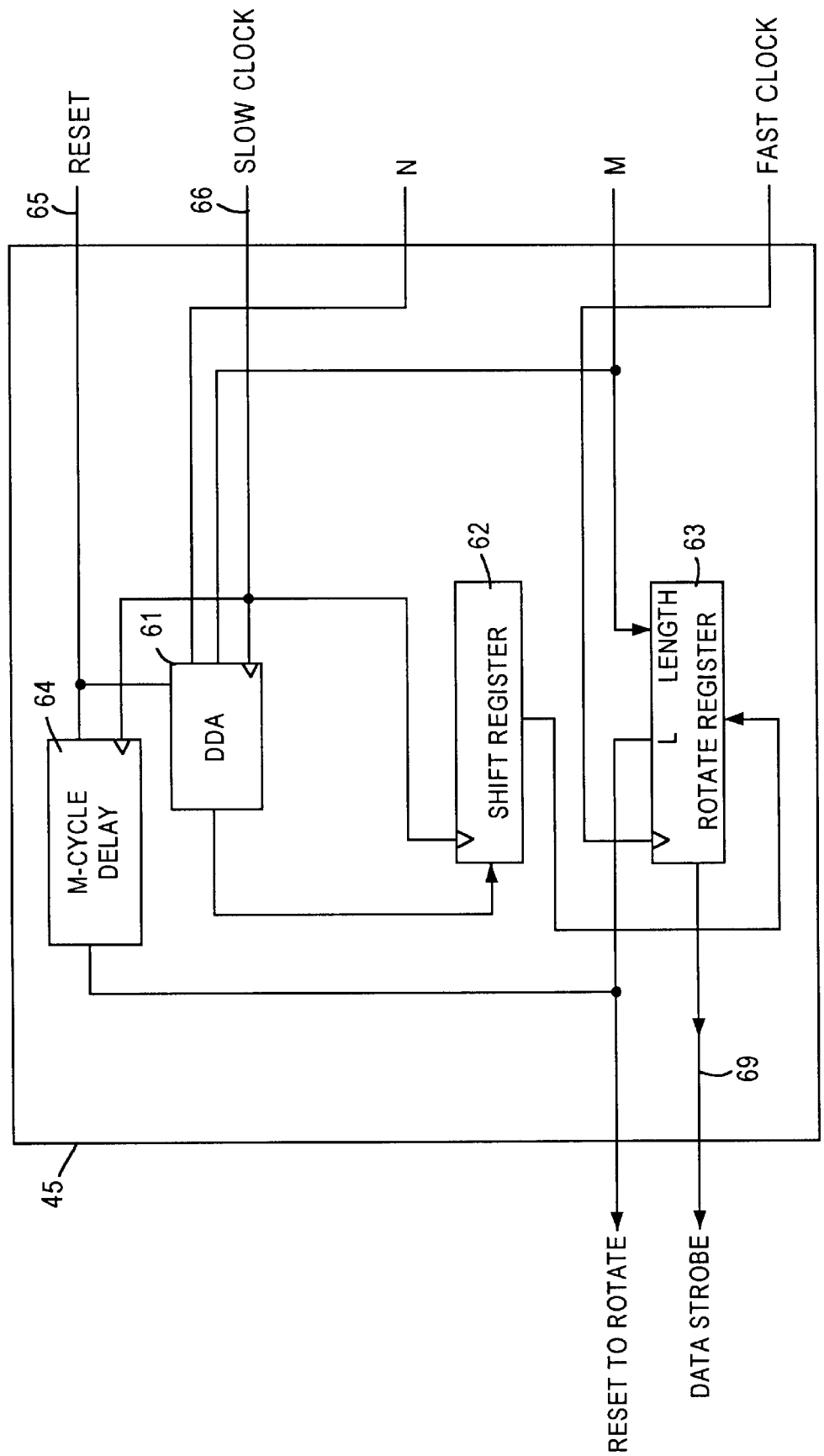
FIG. 4 illustrates an exemplary embodiment of the digital differential analyzer shown in FIGS. 2 and 3.
Figure 1:
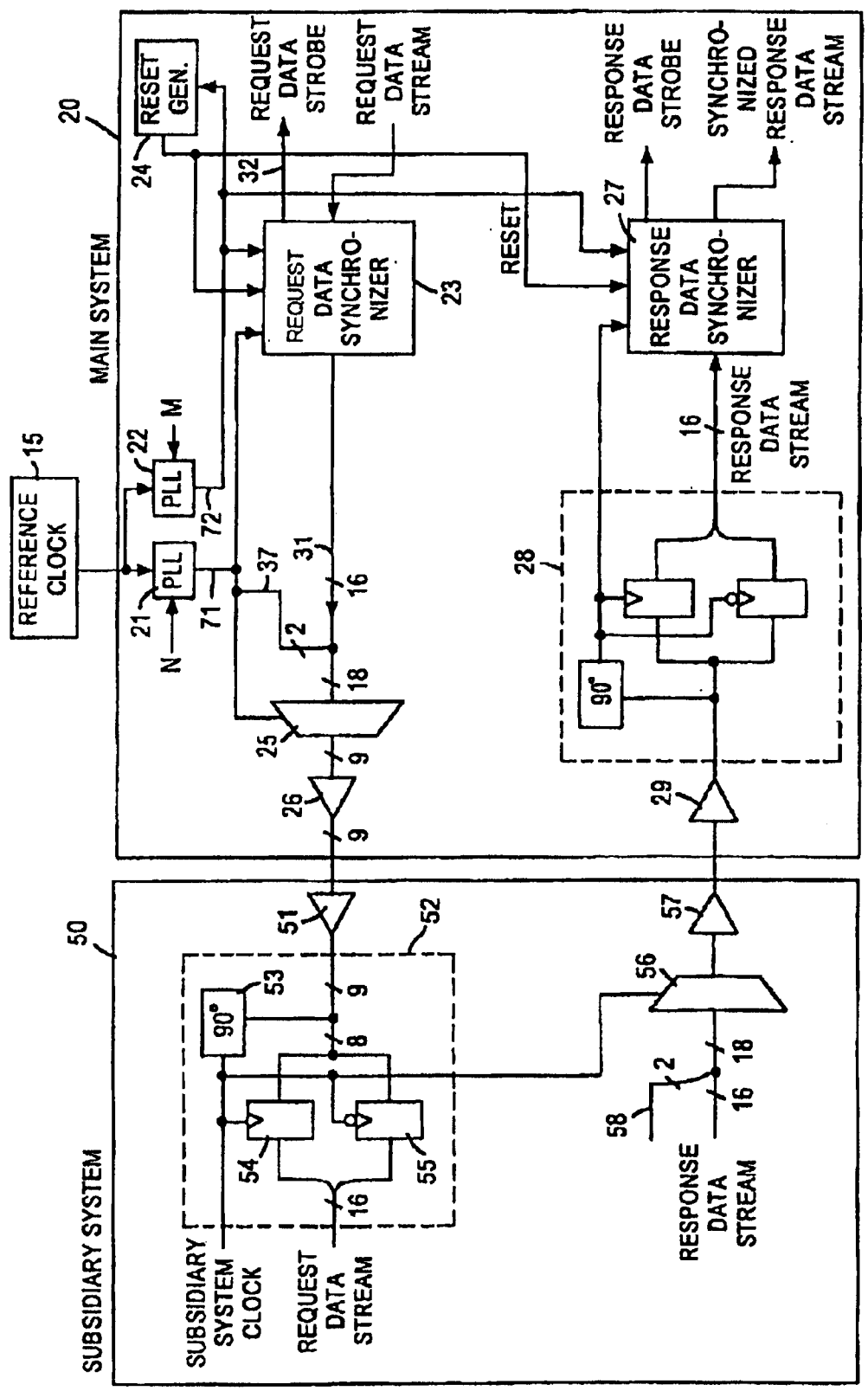

FIG. 4 shows one embodiment of the digital differential analyzer shown in FIGS. 2 and 3. As explained in detail below, this embodiment of the DDA computes the n/m frequency pattern once, at system reset, and then recycles the result through a rotating register. The advantage of this embodiment of the present invention is that the DDA implementation may operate at a much lower rate than the main system clock, which permits the use of slower, smaller, lower power technology for the DDA. The DDA may also be powered off after system reset, further reducing power.

Referring again to FIG. 4, as shown therein the DDA 45 comprises a modified DDA 61, which preferably comprises slower, smaller, lower power technology, a shift register 62, a rotate register 63 and a M-cycle delay circuit 64. The modified DDA receives a reset signal 65, a slow clock signal 66, and M and N as inputs.

In operation, the M-cycle delay 64 receives the reset signal 65 and delays the signal M cycles. The reset signal is delayed by M cycles because the DDA 61 requires M cycles to produce the pattern representing the synchronization signal (i.e., the relationship between the distinct clock domains). For example, the pattern may represent the even distribution of N pulses over a period of M cycles. As such, in the first M cycles after reset, the DDA 61 functions to fill the shift register 62 with the pattern of 1's and 0's representing the synchronization signal. After the initial delay period of M cycles, the delayed signal is transmitted to the rotate register 63, whereby the register 63 is loaded with the value in the shift register 62. Rotate register 63 also receives M as an input which operates to select the length of the rotate register, which is variable.

After loading the pattern into the rotate register 63 and defining a length, the rotate register 63 is clocked by a fast clock that corresponds to the main system clock, and repetitively produces the synchronization signal (i.e., data strobe 69) at a high speed. The data strobe 69 is coupled to the enable input of rotate register 44 illustrated, for example, in FIG. 2, and functions to control the reading of the registers 42.

It should also be apparent that the DDA 45 shown in FIGS. 2 and 3 have the same inputs and produce the identical output, so that a single instance of the DDA 45 may be employed for both the request data synchronizer 23 and response data synchronizer 27. It should further be apparent that if the request and response data synchronizers have the same number of data registers 42, then the rotate register 41 of one data synchronizer and the rotate register 44 of the other data synchronizer have the same inputs and produce identical outputs, except for a rotation of the output bits. Accordingly, a single instance of these blocks may be employed for both the request data synchronizer 23 and response data synchronizer 27. It should further be apparent that when multiple subsidiary systems are employed as the same communications clock rate, that a single DDA 45 (and a single PLL) can be employed for each instance of the request and response synchronizers. It should also be apparent that multiple instances of the subsidiary system may be inserted in series without disturbing the basic characteristics of the synchronization system. It should also be apparent that any circuit which produces the necessary n/m pattern can be employed by the circuit illustrated in FIG. 4 to load the rotating register. For example, a PLA may be used to generate the pattern, given some limited-range values for N and M.

As stated the method and apparatus of the present invention provides important advantages over the prior art. Most importantly, the use of the present invention performs the required synchronization with minimal delay and maximum reliability. The present invention also provides for the use of a DDA utilizing slower, smaller, lower power technology, so as to further reduce cost and minimize necessary operating power requirements.

Although the elements of the present invention have been described in conjunction with an exemplary embodiment, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

What is claimed is:

1. A method of synchronizing a data stream between two distinct clock domains, said method comprising the steps of:
   receiving said data stream at a rate of a first clock;
   sequentially loading said data stream into a plurality of registers at said first clock rate;
   utilizing a digital differential analyzer to generate a synchronization signal having a frequency proportional to a ratio of said first clock rate and a rate of a second clock; and
   sequentially reading said plurality of registers at a rate corresponding to said frequency of said synchronization signal.

2. A method of synchronizing a data stream between two distinct clock domains according to claim 1, wherein said sequential loading of said data stream comprises:
   loading an $x^{th}$ word of said data stream into a $y^{th}$ register of said plurality of registers during a first clock cycle of said first clock; and
   loading an $X^{th}+1$ word of said data stream into a $y^{th}+1$ register of said plurality of registers during a second clock cycle of said first clock.

3. A method of synchronizing a data stream between two distinct clock domains according to claim 1, wherein said sequential loading of said data stream comprises:
   wherein for said plurality of registers comprising y registers, each register is reloaded with a new word of said data stream every $y^{th}+1$ cycles of said first clock.

4. A method of synchronizing a data stream between two distinct clock domains according to claim 1, wherein said synchronization signal comprises M pulses every N cycles, said M pulses being distributed substantially evenly throughout the N cycles.

5. An apparatus for synchronizing a data stream between two distinct clock domains, said apparatus comprising:
   an input means for receiving said data stream at a rate of a first clock;
   a means for sequentially loading said data stream into a plurality of registers at said first clock rate;
   a digital differential analyzer operative for generating a synchronization signal having a frequency proportional to a ratio of said first clock rate and a rate of a second clock; and
   a means for sequentially reading said plurality of registers at a rate corresponding to said frequency of said synchronization signal.

6. The apparatus for synchronizing a data stream between two distinct clock domains according to claim 5, wherein the means for sequentially loading said data stream comprises a rotate register having a predetermined length corresponding to the total number of registers forming said plurality of registers, said rotate register having an output coupled to each of said plurality of registers, said rotate register operative for sequentially enabling each of said plurality of registers to store a word of said data stream.

7. The apparatus for synchronizing a data stream between two distinct clock domains according to claim 5, wherein the means for sequentially reading said plurality of registers comprises:

a multiplexer operative for selecting one of said plurality of registers to be read; and a rotate register coupled to said multiplexer and operative for controlling said multiplexer such that said multiplexer sequentially reads said plurality of registers at a rate corresponding to said synchronization signal.

8. The apparatus for synchronizing a data stream between two distinct clock domains according to claim 5, wherein said synchronization signal comprises M pulses every N cycles, said M pulses being distributed substantially evenly throughout the N cycles.

* * * * *

EX PARTE REEXAMINATION CERTIFICATE (6032nd)

United States Patent
Hansen et al.

(10) Number: US 6,269,136 C1
(45) Certificate Issued: Dec. 4, 2007

(54) DIGITAL DIFFERENTIAL ANALYZER DATA SYNCHRONIZER

(75) Inventors: Craig C. Hansen, Los Altos, CA (US); Timothy B. Robinson, Boulder Creek, CA (US)

(73) Assignee: Microunity Systems Engineering, Inc., Sunnyvale, CA (US)

Reexamination Request:
No. 90/007,618, Jul. 7, 2005

Reexamination Certificate for:
Patent No.: 6,269,136
Issued: Jul. 31, 2001
Appl. No.: 09/017,224
Filed: Feb. 2, 1998

(51) Int. Cl.
*H04L 7/00* (2006.01)
*H04L 7/02* (2006.01)

(52) U.S. Cl. .................... 375/354; 375/355; 370/503; 327/40

(58) Field of Classification Search .................. 375/354, 375/355, 371, 372, 362, 364; 370/503, 516, 370/517, 519; 327/40, 39, 44, 45, 47
See application file for complete search history.

(56) References Cited

U.S. PATENT DOCUMENTS

| | | | |
|---|---|---|---|
| 4,509,119 A | 4/1985 | Gumaer |
| 4,943,919 A | 7/1990 | Aslin |
| 5,208,914 A | 5/1993 | Wilson |
| 5,253,342 A | 10/1993 | Blount |
| 5,256,994 A | 10/1993 | Langendorf |
| 5,287,327 A | 2/1994 | Takasugi |
| 5,327,570 A | 7/1994 | Foster |
| 5,347,643 A | 9/1994 | Kondo et al. |
| 5,371,772 A | 12/1994 | Al-Khairi |
| 5,375,208 A | 12/1994 | Pitot |
| 5,412,728 A | 5/1995 | Besnard et al. |
| 5,430,660 A | 7/1995 | Lueker et al. |
| 5,477,181 A | 12/1995 | Li |
| 5,522,054 A | 5/1996 | Gunlock |
| 5,530,960 A | 6/1996 | Parks |
| 5,826,106 A | 10/1998 | Pang |
| 5,828,869 A | 10/1998 | Johnson |

FOREIGN PATENT DOCUMENTS

| | | |
|---|---|---|
| EP | 0 651 321 A | 5/1995 |
| EP | 0 654 733 A | 5/1995 |
| WO | WO 97/07450 | 2/1997 |

OTHER PUBLICATIONS

Sarmenta et al., Rational Clocking, IEEE International Conference on Computer Design: VLSI in Computers and Processors, 1995. ICCD 1995 Processings, Publication data Oct. 2–4, 1995.*

Horowitz and Hill, The Art of Electronics, Second Edition, Cambridge University Press, 1989, pp. 525–526.*

Wang, Yulun, et al. "The 3DP: A processor Architecture for Three–Dimensional Applications." Computer, IEEE Computer Society, vol. 25, No. 1, 1992, pp. 25–36, XP000287832, ISSN: 0018–9162.

Diefendorff, K. et al. "Organization of the Motorola 88110 Superscalar Risc Microprocessor." IEEE Micro, vol. 12, No. 1, Apr. 1, 1992, XP000266192, ISSN: 0272–1732.

(Continued)

*Primary Examiner*—Albert J Gagliardi

(57) ABSTRACT

A digital differential analyzer data synchronizer receives data at a first clock rate and synchronizes the data to a second clock rate. The two clock rates are related by a ratio of two integers, but have a variable phase relationship. The synchronizer places incoming data into a series of registers at the first clock rate. A digital differential analyzer functions to generate a synchronization signal having a frequency proportional to a ratio of the first clock rate and the second clock rate. A multiplexer is utilized for sequentially reading the plurality of registers at a rate corresponding to the frequency of the synchronization signal.

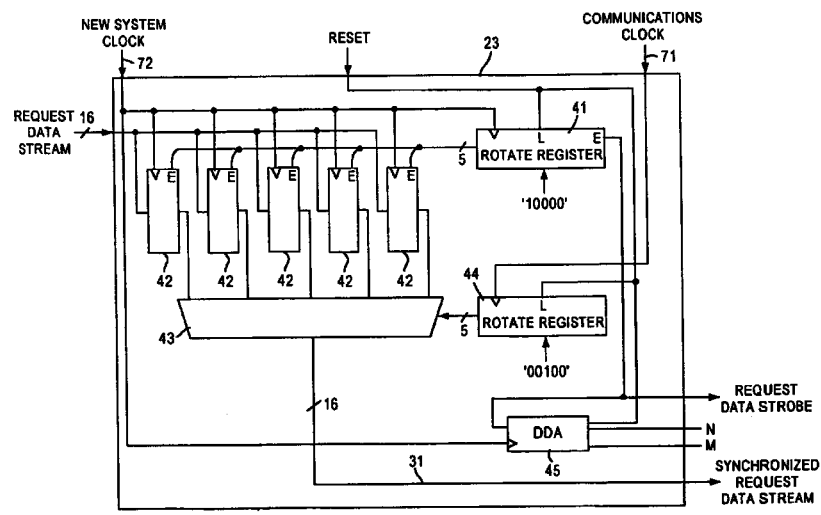

OTHER PUBLICATIONS

Sony Computer Entertainment America, Inc.'s Answer, Affirmative Defenses, and Counterclaim to Microunity Systems Engineering, Inc.'s Original Complaint, *Microunity Systems Engineering, Inc.* v. *Sony Corporation of America*, Civil Action No. 2:05 CV 505, Filed Feb. 14, 2006.

Foley, J. et al., "Fundamentals of Interactive Computer Graphics," Addison–Wesley Publishing Co. (1982).

IEEE Standard for Scalable Coherent Interface, IEEE Computer Society, IEEE Std 1596–1992, Aug. 2, 1993.

Asprey et al., "Performance Features of the PA7100 Microprocessors," IEEE Micro, 22–35 (Jun. 1993).

BSP and BSP Customer Attributes, Inclosure 5, Burroughs Corporation (Aug. 1, 1977).

BSP Floating Point Arithmetic. Burroughs Corporation, (Dec. 1978).

BSP Implementation of Fortran, Burroughs Corporation, (Feb. 1978).

BSP, Burroughs Scientific Process, Burroughs Corporation. 1–29 (Jun. 1977).

Bursky, "Synchronous DRAMs Clock at 100 MHz," Electronic Design, vol. 41, No. 4, 45–49 (Feb. 18, 1993).

"System Architecture." ELXSI (2d Ed. Oct. 1983).

"System Foundation Guide," ELXSI (1st Ed. Oct. 1987).

IEEE Draft Standard for "Scalable Coherent Interface–Low–Voltage Differential Signal Specifications and Packet Encoding", IEEE Standards Department, P1596.3/D0.15 (Mar. 1992) (50006DOC018530–563).

IEEE Draft Standard for "High–Bandwidth Memory Interface Based on SCI Signaling Technology (RamLink)," IEEE Standards Department, Draft 1.25 IEEE P1596.4–199X (May 1995) (50006DOC018413–529).

Undy et al., "A Low–Cost Graphics and Multimedia Workstation Chip Set," IEEE Micro, pp. 10–22 (Apr. 1994) (51056DOC002578–590).

Broughton et al., "The S–1 Project: Top–End Computer Systems for National Security Applications," (Oct. 24, 1985) (51056DOC057368–607).

Convex Data Sheet C4/XA Systems, Convex Computer Corporation (51056DOC059235–236).

Convex C4600 Assembly Language Manual, First Edition, May 1995 (51056DOC064728–5299).

Margulis, "i860 Microprocessor Architecture," Intel Corporation (1990) (51056DOC066610–7265 and 5156DOC069971–70626).

Paragon User's Guide, Intel Corporation (Oct. 1993) (51056DOC068802–9097).

Hwang, "Computer Architecture and Parallel Processing," McGraw Hill (1984) (51056DOC070166–1028).

\* cited by examiner

US 6,269,136 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

THE DRAWING FIGURES HAVE BEEN CHANGED AS FOLLOWS:

Response data synchronizer (23) changed to request data synchronizer.

AS A RESULT OF REEXAMINATION, IT HAS BEEN DETERMINED THAT:

The patentability of claims 1–8 is confirmed.

New claims 9–30 are added and determined to be patentable.

*9. A method of synchronizing a data stream between two distinct clock domains, said method comprising the steps of:*
  *receiving said data stream at a rate of a first clock;*
  *sequentially loading said data stream into a plurality of registers at said first clock rate;*
  *utilizing a digital differential analyzer to generate a synchronization signal having a frequency proportional to a ratio of said first clock rate and a rate of a second clock, wherein the first clock has a variable phase with respect to the second clock; and*
  *sequentially reading said plurality of registers at a rate corresponding to said frequency of said synchronization signal.*

*10. The method of claim 9 wherein the digital differential analyzer is capable of generating a portion of the synchronization signal once and repeatedly outputting the portion of the synchronization signal; and*
  *sequentially reading said plurality of registers at a rate corresponding to said frequency of said synchronization signal.*

*11. The method of claim 10 wherein the step of repeatedly outputting the portion of the synchronization signal is performed by using a rotate register loaded with the portion of the synchronization signal and operable to repeatedly output the portion of the synchronization signal.*

*12. The method of claim 11 wherein the rotate register has a selectable length.*

*13. The method of claim 10 wherein said data stream is a return data stream that is part of bi-directional communications between a first system and a second system, the bi-directional communications including a forward data stream sent from the first system to the second system and said return data stream send from the second system to the first system.*

*14. The method of claim 13 wherein the forward data stream is sent from the first system at said first clock rate and at a first phase, and the return data stream is received at the first system at said first clock rate and at a second phase that is variable with respect to the first phase.*

*15. The method of claim 9 wherein receiving the data stream involves sampling the data stream at a plurality of sample times, the sample times being aligned with a 90-degree phase shifted version of the first clock.*

*16. The method of claim 9 wherein receiving the data stream involves sampling the data stream at a plurality of sample times, some of the sample times corresponding to positive edges of the first clock, and some of the sample times corresponding to negative edges of the first clock.*

*17. The method of claim 9 wherein receiving the data stream involves sampling the data stream at a plurality of sample times, the sample times being aligned with a 90-degree phase shifted version of the first clock, some of the sample times corresponding to positive edges of the first clock, and some of the sample times corresponding to negative edges of the first clock.*

*18. The method of claim 9 wherein receiving the data stream involves sampling the data stream at a plurality of sample times, to sample 8 bits at each sample time.*

*19. An apparatus for synchronizing a data stream between two distinct clock domains, said apparatus comprising:*
  *an input means for receiving said data stream at a rate of a first clock;*
  *a means for sequentially loading said data stream into a plurality of registers at said first clock rate;*
  *a digital differential analyzer operative for generating a synchronization signal having a frequency proportional to a ratio of said first clock rate and a rate of a second clock, wherein the first clock has a variable phase with respect to the second clock; and*
  *a means for sequentially reading said plurality of registers at a rate corresponding to said frequency of said synchronization signal.*

*20. The apparatus of claim 19 wherein the digital differential analyzer is capable of generating a portion of the synchronization signal once and repeatedly outputting the portion of the synchronization signal; and*
  *a means for sequentially reading said plurality of registers at a rate corresponding to said frequency of said synchronization signal.*

*21. The apparatus of claim 20 wherein the digital differential analyzer comprises a rotate register capable of being loaded with the portion of the synchronization signal and operable to repeatedly output the portion of the synchronization signal.*

*22. The apparatus of claim 21 wherein the rotate register has a selectable length.*

*23. The apparatus of claim 20 wherein the input means is capable of sampling the data stream at a plurality of sample times, the sample times being aligned with a 90-degree phase shifted version of the first clock, some of the sample times corresponding to positive edges of the first clock, and some of the sample times corresponding to negative edges of the first clock.*

*24. The apparatus of claim 20 wherein the input means is capable of sampling the data stream at a plurality of sample times, to sample 8 bits at each sample time.*

*25. The apparatus of claim 19,*
  *wherein said data stream is a return data stream that is part of bi-directional communications capable of being conducted between a first system and a second system, the bi-directional communications including a forward data stream sent from the first system to the second system and said return data stream send from the second system to the first system; and*
  *wherein said an input means, means for sequentially loading said data stream, digital differential analyzer, and means for sequentially reading said plurality of registers are part of the first system.*

26. The apparatus of claim 25 wherein the forward data stream is capable of being sent from the first system at said first clock rate and at a first phase, and the return data stream is capable of being received at the first system at said first clock rate and at a second phase that is variable with respect to the first phase.

27. The apparatus of claim 19 wherein the input means is capable of sampling the data stream at a plurality of sample times, the sample times being aligned with a 90-degree phase shifted version of the first clock.

28. The apparatus of claim 19 wherein the input means is capable of sampling the data stream at a plurality of sample times, some of the sample times corresponding to positive edges of the first clock, and some of the sample times corresponding to negative edges of the first clock.

29. The apparatus of claim 19 wherein the input means is capable of sampling the data stream at a plurality of sample times, the sample times being aligned with a 90-degree phase shifted version of the first clock, some of the sample times corresponding to positive edges of the first clock, and some of the sample times corresponding to negative edges of the first clock.

30. The apparatus of claim 19 wherein the input means is capable of sampling the data stream at a plurality of sample times, to sample 8 bits at each sample time.

* * * * *